Aug. 12, 1952     M. G. PAWLEY     2,606,966
PHASE SHIFTING NETWORK
Filed Aug. 23, 1951     3 Sheets—Sheet 1
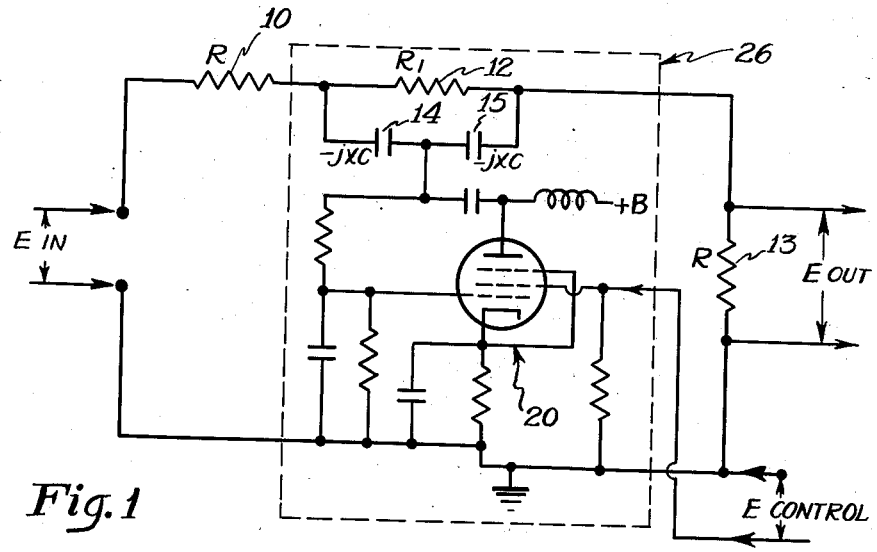
Fig. 1
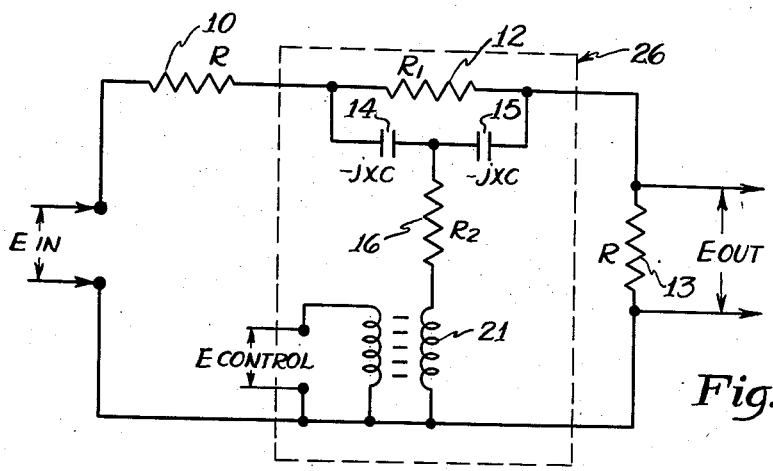
Fig. 1-A
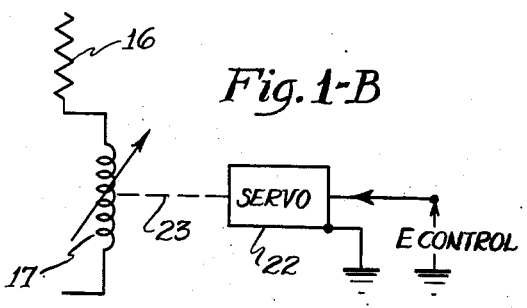
Fig. 1-B
INVENTOR
Myron G. Pawley
BY
ATTORNEYS Aug. 12, 1952    M. G. PAWLEY    2,606,966
PHASE SHIFTING NETWORK
Filed Aug. 23, 1951    3 Sheets-Sheet 2
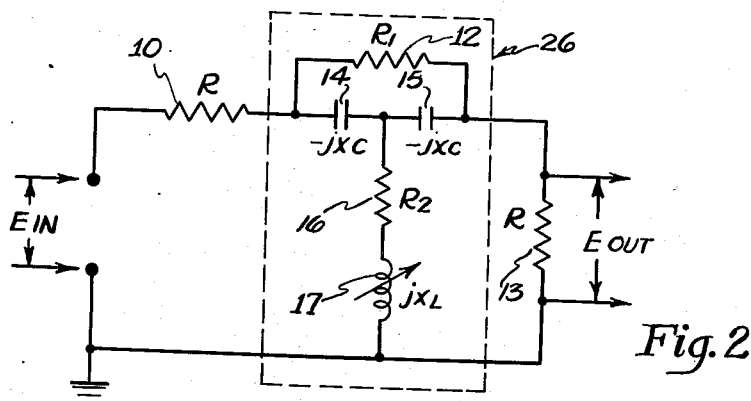
Fig. 2
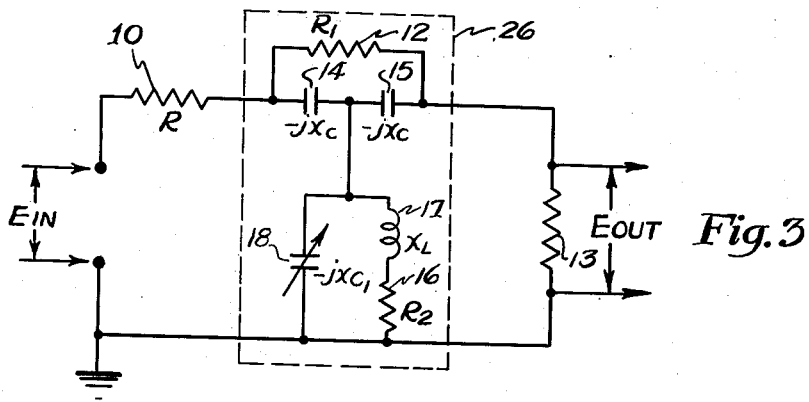
Fig. 3
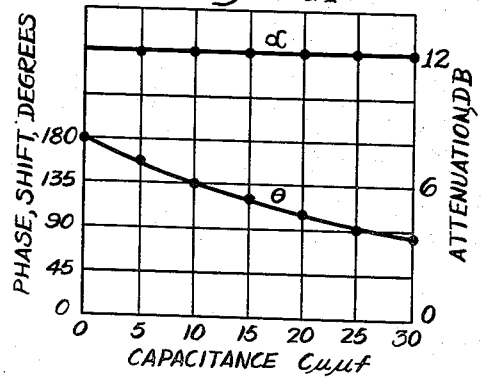
Fig. 3-A
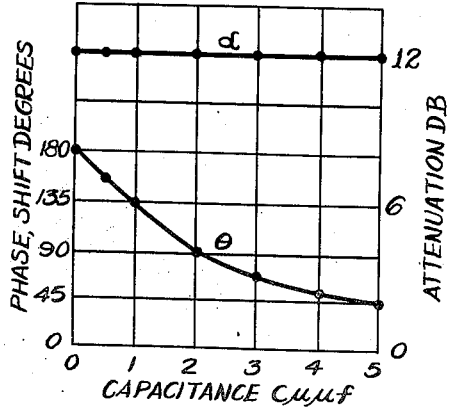
Fig. 3-B
INVENTOR
Myron G. Pawley
BY
G. D. O'Brien
Q. Baxter Warner
ATTORNEYS Aug. 12, 1952     M. G. PAWLEY     2,606,966
PHASE SHIFTING NETWORK
Filed Aug. 23, 1951     3 Sheets-Sheet 3

*Fig. 4-A*

INVENTOR
Myron G. Pawley

BY
ATTORNEYS

Patented Aug. 12, 1952

2,606,966

UNITED STATES PATENT OFFICE 2,606,966

PHASE SHIFTING NETWORK

Myron G. Pawley, Alexandria, Va., assignor to the United States of America as represented by the Secretary of the Navy Application August 23, 1951, Serial No. 243,342

13 Claims. (Cl. 178—44)

(Granted under the act of March 3, 1883, as amended April 30, 1928; 370 O. G. 757)

This device relates to electrical voltage phase shifting networks, and more particularly to phase shifting networks of the bridged-T type having a constant attenuation with change of phase.

Many types of electrical phase shifting devices are known to the art, including magnetic coil configurations energized by rotating magnetic fields, electrostatic condenser arrangements utilizing specially shaped plates, and electrical circuit networks comprising standardized resistors, capacitors, and inductors in given arrangements. The phase shifting devices other than the network types have in general been complex and expensive, requiring specially constructed coil or condenser structures.

Electrical network phase shifters, as heretofore known to the art, are constructed of standardized electrical components and hence are inexpensive and widely used. They have developed along two types of network configuration, termed the unsymmetrical bridge type and the balanced lattice network type.

The balanced lattice type phase shifting network is highly satisfactory for many applications, but due to its balanced configuration does not permit a ground connection common to input and output circuits, and as termed by the art is a double ended network. Hence, in the numerous electrical and electronic circuits having a common ground, the balanced lattice network must be modified by the addition of isolating devices. A further limitation inherent in the balanced lattice type network resides in the necessity for variation of more than one control element in effecting phase shift. This is brought about due to the symmetrical arrangement of the electrical components in the balanced lattice configuration, and requires the use of twin electrical components which are evenly matched in value and mechanically or electrically ganged for simultaneous adjustment.

The unsymmetrical bridge type network is like the lattice a double ended type, with no common ground connecting input and output circuits, and hence must also be modified by the addition of isolating devices when applied in single ended circuits. Unlike the balanced lattice, the bridge network configuration is not balanced and therefore a variation of only one impedance is required to effect a phase shift.

The present device comprises a four terminal phase shifting network preferably constructed of standardized electrical components in a configuration resembling that of a bridge-T network. This type network construction differs from the unsymmetrical bridge and balanced lattice phase shifting networks in having a ground connection common to input and output terminals, which common connection renders the circuit applicable in single ended networks without additional isolation coupling commonly used with the above-mentioned balanced lattice and unsymmetrical bridge networks. Obviously, the elimination of these additional coupling devices greatly simplifies the overall phase shifting device both in construction and operation providing a lesser number of electrical components for performing the required functions. Although this particular bridged-T type network configuration is generally known to the art, heretofore its application in electrical circuits has been confined to producing a voltage null for purposes of measurement and control, and accordingly the art has taught a series of mathematical formulae interrelating the network's component values allowing this type operation. In the present device, however, it has been found that relating the network component values in accordance with a different series of specific mathematical formulae, which will be set forth in detail hereinafter, a new and unexpected operation results, wherein the electrical network characteristics are radically different from those of the conventional bridged-T null network, in that a variation of a single control impedance enables the network to phase shift alternating current signals over a wide range, while maintaining a constant attenuation of the input voltage. Inherently, due to these network values, the circuit further provides a relatively low input and output impedance, permitting its operation in low impedance circuits without additional matching devices; and due to its common ground connection provides stable operation when utilized at either high or low frequencies.

It is therefore one object of this invention to provide an electrical network operative to vary voltage phase over a wide range with constant attenuation.

A further object is to provide a stable electrical phase shifting network of simple construction having a ground connection common to input and output circuits as well as for one end of its phase controlling impedance.

A further object is to provide an electrical network for phase shifting a voltage by variation of a single impedance.

A further object is to provide an electrical network for phase shifting a voltage over a wide range with small variation of a control component.

A further object is to provide an electrical phase shifting network which may be constructed to operate stably at either high or low frequencies.

A further object is to provide an electrical phase shifting network efficiently operable in low impedance circuits.

A still further object is to provide an electrical phase shifting network constructed of standardized components.

Other objects and features will be readily apparent to those versed in this art during the course of the following description, taken in connection with the accompanying drawings forming a part of this specification:

Fig. 1 is an electrical phase shifting network constituting one preferred embodiment of the invention, wherein voltage phase is varied by change in the value of a reactance tube circuit;

Fig. 1A is an electrical phase shifting network similar to Fig. 1, in which voltage phase is varied by change in the value of a saturable reactor;

Fig. 1B is an alternative form of variable inductor for use in the network of Fig. 1 or Fig. 1A;

Fig. 2 is a simplified network for generally illustrating the electrical operation of the circuit of Fig. 1;

Fig. 3 is a simplified network for generally illustrating the electrical operation of an alternative arrangement of the device of Fig. 1;

Fig. 3A is a graph of the phase and attenuation characteristics of the Fig. 3 network when energized at a given frequency;

Fig. 3B is a similar graph for the Fig. 3 network when energized at a higher frequency;

Figure 4:
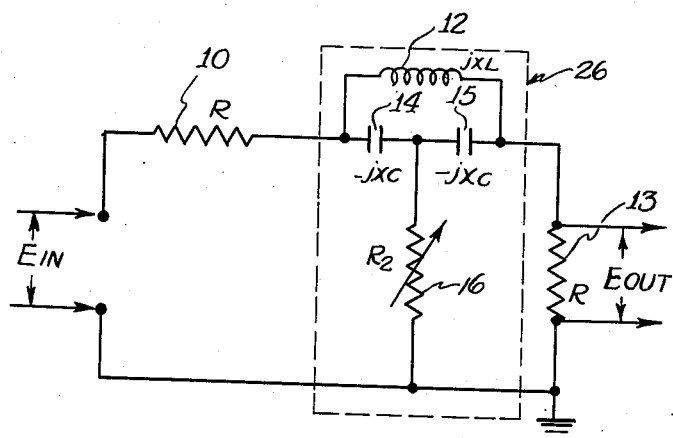
Fig. 4 is a simplified network for generally illustrating the electrical operation of a second preferred embodiment of the invention.

Referring now to the drawings, Fig. 1 illustrates one preferred embodiment of the invention comprising a bridged-T type network shown within a dotted enclosure generally designated 26, in series with an input resistance 10 and an A.-C. energizing source $E_{in}$ to ground, and an output resistance 13 connected from the network output to ground, and constituting the load across which is derived the output voltage $E_{out}$. The number designations in the figure refer to the elements, while the letter designations refer to the values of the elements; therefore, elements having the same letter designations are equal in value and sign. Energizing source $E_{in}$ and input resistance 10 represent the equivalent circuit of an actual energizing source having internal resistance. Within the enclosure 26, the circuit includes a resistance 12 of value $R_1$ shunted by two series connected capacitors 14 and 15 each having a reactance value $X_c$. An electron tube circuit generally designated as 20 constitutes the T leg of the network connecting the junction point of capacitors 14 and 15 to ground. This tube circuit operates as a variable reactance whose value may be controlled by a voltage source $E_{control}$ energizing the electron tube screen grid. Tube circuits of this nature interconnected to operate as reactances, either inductive or capacitive, are known to the art and their details may be found in various text books such as "Basic Radio" by J. Barton Hoag, D. Van Nostrand Company, Inc. thirteenth printing 1949 page 272. All of the circuit elements shown in Fig. 1 are assumed to have fixed values excepting the reactance presented by the tube circuit 20 whose value may be varied by the control voltage $E_{control}$ as enumerated above. A series of mathematical formulae relate the values of the several bridged-T type network elements and load resistance, and due to the network configuration and given mathematically interrelated element values, this network functions to shift the phase of the output voltage $E_{out}$ with respect to that of input voltage $E_{in}$ over a wide range while maintaining the magnitude of the output voltage at a constant ratio with respect to the input voltage, this being accomplished by merely varying the value of the control voltage $E_{control}$. These particular series of mathematical formulae permitting this given operation will be disclosed in connection with the equivalent circuits of Figs. 2, 3 and 5.

Fig. 1A illustrates a modification of the bridged-T type network of Fig. 1 in which the reactance tube circuit connecting the junction of capacitors 14 and 15 to ground is replaced by a series circuit comprising a fixed resistor 16 of value $R_2$ and a saturable reactor 21 whose value may be varied by a voltage $E_{control}$. As in Fig. 1, the values of the network elements and output and input resistors are similarly interrelated mathematically permitting variation of voltage $E_{control}$ to shift the phase of voltage $E_{out}$ with respect to voltage $E_{in}$ while maintaining the ratio of their respective magnitudes substantially constant.

Fig. 1B illustrates a second alternative arrangement for the T leg impedance of Fig. 1, wherein the reactance tube circuit 20 is replaced by a fixed resistor 16, and a variable inductor 17, whose value may be varied in response to a voltage $E_{control}$ by means of a servo 22 and shaft 23 positioning a tuning slug or movable tap.

Fig. 2 is a bridged-T type network similar to the networks of Figs. 1, 1A, and 1B, wherein the variable electro-responsive T leg impedance connecting the junction of capacitors 14 and 15 to ground are replaced by simple electrical elements, including a fixed resistance 16 of value $R_2$, and a variable inductor 17 of reactance value $X_L$, for purposes of general electrical analysis of the networks of Figs. 1, 1A, and 1B. The values of similarly lettered elements are equal in magnitude and sign, and bear the relationship with the remaining elements:

(1) $\quad X_c \gg R_1 > 2R$ (2) $\quad \dfrac{R_1}{2} = R + 4R_2$

When this circuit is energized by an alternating voltage of fixed magnitude and frequency $E_{in}$, a voltage $E_{out}$ appears across output resistance 13 whose magnitude is directly related to the input voltage, but out of phase therewith. As the value of inductance 17 is varied, the ratio of the output voltage to the input voltage remains constant, but the phase relation is varied dependent upon the new value of inductance 17.

Fig. 3 is an illustration of a bridged-T type phase shifting network similar to Fig. 2 with the addition of a variable capacitance 18, whose reactance is designated $X_{c1}$, in shunt with inductance 17 and resistance 16 in the T leg. Variable capacitance 18 is preferably an electro-responsive capacitor such as a capacitive reactance tube circuit, a servo driven capacitor, or other non-manual device whose value may be rapidly and accurately varied. Inductance 17 has a fixed reactance value $X_L$ made equal to one-half the capacitive reactance $X_c$ of capacitor 14:

$$(3) \qquad X_L = \frac{X_c}{2}$$

and the newly added variable capacitor 18 has a reactance value $X_{c1}$, which at all times is much greater than the reactance $X_L$ of inductor 17 it shunts.

$$(4) \qquad X_{c1} \gg X_L$$

The network resistance values $R_1$ and $R_2$ are related to the input and output resistance values R by Equation 2, and their relative magnitudes are related to reactance $X_c$ of capacitor 14 by Equation 1. The variation of a capacitor 18 in the parallel circuit comprising impedance to vary through values predominantly inductive to values predominantly capacitive resulting in a greater variation of output voltage phase displacement than in the circuit of Fig. 2.

Fig. 3A is a graph showing the phase displacement $\theta$ and attenuation $\alpha$ of a network similar to Fig. 3 as the control capacitor 18 is varied. Equations 1 to 4, inclusive, interrelate the values of the several network elements, and the energizing source $E_{in}$ operates at a frequency of 4170 C. P. S. The absolute values of the network and load elements for the given graph represented are:

$R = 1,000$ ohms
$R_1 = 5,120$ ohms
$R_2 = 390$ ohms
$C$ (element 14) $= 520$ micro-microfarads
$L = 1.4$ henrys however, it is emphasized that these absolute values may be varied, and their sole requirement, for this embodiment, constitutes the value relationships expressed by Equations 1 to 4, inclusive. The upper curve representing the attenuation $\alpha$ of the network remains constant at 12 decibels, as the control element 18 is varied. However, the lower curve representing the phase $\theta$ between output and input shows a variation of approximately 100 degrees as capacitor 18 is varied from 0 $\mu\mu f$. through 30 $\mu\mu fd$. These curves clearly illustrate the wide range of phase shift obtainable by the present invention at low frequencies with small changes of control element value, while providing constant attenuation of the input voltage.

Fig. 3B is a graph similar to Fig. 3A illustrating the electrical characteristics of the Fig. 3 type network when energized at a much higher frequency of 29.1 mc., and the circuit elements have the values:

$R = 50$ ohms
$R_1 = 114$ ohms
$R_2 = 1.75$ ohms
$C = 10.5$ micro-microfarads
$L = 1.44$ microhenrys The relationship of these elements is determined by Equations 1 to 4, but their values differ from those of Fig. 3A due to reactance design at high frequencies. The upper curve, as in Fig. 3A shows a constant attenuation $\alpha$ of 12 decibels as control element 18 is varied from 0 $\mu\mu fd$. to 5$\mu\mu fd$., while the lower curve illustrates a change in phase angle $\theta$ of 135 degrees for this control element variation. These Figs. 3A and 3B, clearly illustrate the wide range of phase shift resulting from a relatively small variation of a single control reactance, while a constant attenuation ratio relating input to output voltage is maintained, provided the network is designed in accordance with the previously discussed relationship of element values. This phase shift with a given variation of control reactance becomes greater as the frequency is increased; for example, at 4170 C. P. S. (Fig. 3A) a 5$\mu\mu fd$. change in control reactance yields a phase displacement of approximately 10–20 degrees, whereas a similar control reactance change at 29.1 mc. (Fig. 3B) yields a phase displacement of approximately 135 degrees.

Fig. 4 is a simplified illustration of a second preferred embodiment of the invention, constituting a bridged-T type phase shifting network which differs from the network of Figs. 2 and 3 in permitting variation of phase shift by means of a control resistance 16 having a value $R_2$. This control element although represented as a simple variable resistance may in an actual circuit constitute an electron tube variable resistance circuit, electro-responsive resistive component, thermo-responsive resistive component, or other nonmanual device as known to the art. Referring now to the network within dotted enclosure 26 of Fig. 4, a fixed inductance 12 having a resistance value $X_L$ is shunted by two series connected equal value capacitors 14 and 15 each having a reactance value $X_c$. Connecting the junction of capacitors 14 and 15 to ground, and constituting the T leg of the bridged-T type network, is the variable resistive element 16 having a value $R_2$. The given electrical characteristics attributable to the network permitting wide range of phase shift with constant attenuation as resistive component 16 is varied are dependent upon the following element value relationship:

$$(5) \qquad Q = \frac{X_L}{R_{of\ coil}} \gg 1$$

$$(6) \qquad X_L = 4X_c \gg 2R$$

Equation 5 specifies that the Q of coil 12, representing the ratio of inductive reactance $X_L$ to the resistance of the coil $R_{of\ coil}$ is much greater than one, illustrating that element 12, at the frequency of operation comprises substantially pure inductive reactance. Equation 6 interrelating the inductive reactance $X_L$ of inductor 12 to capacitor reactance $X_c$ of capacitors 14 or 15, illustrates that the reactance of inductor 12 is made equal to twice the combined reactance of the series capacitors 14 and 15, which values are both much greater than twice the value R of the input or output resistors 10 and 13.

Fig. 4A is a graph illustrating the operation of an actual circuit similar to Fig. 4 when the network is energized by a source at 4170 C. P. S.; and elements 12, 14, and 15, and input and output resistances 10 and 13, have the following values:

$R = 1,000$ ohms
$C = .004$ microfarad ($\mu fd$.)
$L = 1.4$ henrys
$Q = 94$

The upper curve labeled $\theta$ shows that the phase ratio relating output to input voltages $E_{out}$ to $E_{in}$ respectively, varies from 250 degrees to approximately 130 degrees as the control resistance $R_2$ varies through values of 0 to 1,000 ohms. The lower curve labeled $\alpha$ shows the network attenuation, as the control resistance $R_2$ is varied through the above-mentioned values, to be substantially constant and to have a value of 30 decibels.

Comparing the common electrical characteristics of the two network embodiments represented by the graphs of Figs. 3A, 3B, and 4A, it is seen that both network types enable a voltage $E_{out}$ to be phase displaced over a wide range of values while maintaining a substantially constant magnitude. Each of these networks have their several elements connected in a bridged-T type configuration permitting this phase displacement to be effected by means of a single control, while allowing a common ground connection between one side of this control and one side of each of the input and output voltages. As discussed above, these common characteristics attributable to the bridged-T configuration enable this network to be utilized in so-called single ended circuits eliminating the need for additional impedance balancing and isolation devices commonly used with the other forms of electrical network time phase shifters.

Figure 5:
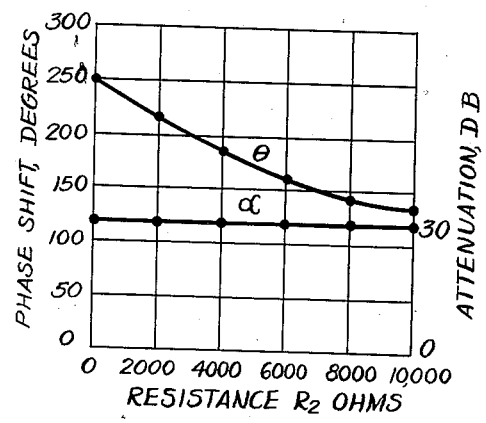
Fig. 5 is a block diagram of an electrical phase shifting network of the type of Figs. 1–4 inclusive for purposes of mathematical analysis.
Figure 5:
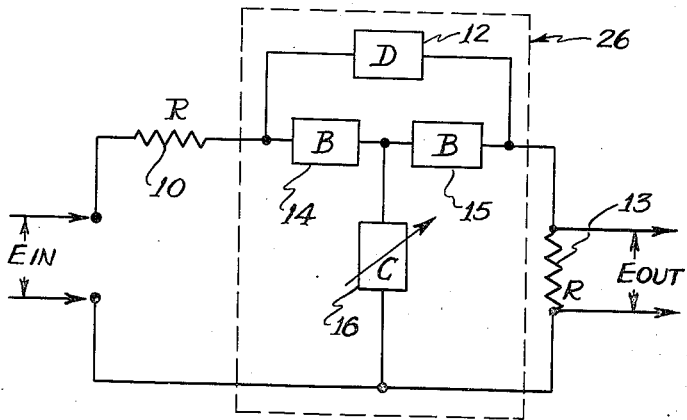

The following is a summary of the common derivation of the mathematical interrelation of values of the several electrical elements in each of the above discussed bridged-T type phase shifting networks, had in conjunction with the generalized block diagram form of bridged-T network of Fig. 5, wherein the complex ratio of output voltage to input voltage is shown as a given function of the network arms, and the input and output resistance. A detailed mathematical analysis of the steps relating the following salient formulae is made in a publication by Myron G. Pawley entitled "Wide-range phase control with constant attenuation by adjustable impedance in a resistance-loaded bridged-T network," in the Journal of Research of the National Bureau of Standards, volume 45, No. 3, September 1950, pages 193-200, inclusive.

Referring to Fig. 5, the various impedance arms of the network are represented by blocks designated by capital letters B, C, and D. These blocks are assumed to contain complex impedance values, and blocks having the same alphabetical designation are deemed to include impedances of equal magnitude and sign. It has been found that the complex ratio of output voltage ($E_{out}$) to input voltage ($E_{in}$) in a bridged-T network having the configuration of Fig. 5 may be generally represented as:

(7) $$\frac{E_{out}}{E_{in}} = \frac{R}{2}\left(\frac{1}{Z_a} - \frac{1}{Z_b}\right)$$

where R is the value of equal input and output resistances 10 and 13, and (8) $$Z_a = R + \frac{\frac{D}{2}B}{\frac{D}{2}+B}$$

(9) $$Z_b = R + B + 2C$$

Making the complex values of $Z_a$ and $Z_b$ of Equation 7 such that the difference of their reciprocals is a complex number having a constant magnitude and variable phase angle, it may then be seen from Equation 7 that the complex ratio of output voltage $E_{out}$ to input voltage $E_{in}$ has a constant magnitude and variable phase displacement, enabling the circuit to perform as a constant attenuation phase shifter. From Equation 8, the impedance $Z_a$ comprises the sum of input resistor 10 plus the impedance presented by a parallel combination of one-half the complex value D of arm 12 and the complex value B of series impedance 14; and from Equation 9, the impedance $Z_b$ comprises the sum of input resistor 10, plus the complex value B of the series T impedance 14 plus twice the complex value C constituting the variable T leg 16. Therefore, the construction of a bridged-T type network of the configuration of Figs. 1-4 inclusive whose component arm impedance values satisfy the relationships expressed in Equations 7, 8, and 9 enables this network to shift time phase by varying the impedance value C of network arm 16. For example, referring to the network of Fig. 2, network arm D is composed of resistor 12 of fixed value $R_1$, arm B is composed of fixed capacitor 14 of reactance value $-jX_c$ and arm C is composed of fixed resistor 16 of value $R_2$ and variable inductor 17 of reactance value $jX_L$ connected in series. Substituting the values of these arms in generalized Equations 8 and 9, the values of $Z_a$ and $Z_b$ for the circuit of Fig. 2 are:

(10) $$Z_a = R + \frac{R_1}{2}$$

(11) $$Z_b = (R + 2R_2) + j(2X_L - X_c)$$

Now substituting the values of $Z_a$ and $Z_b$ shown in Equations 10 and 11 into Equation 7, the complex ratio of output voltage to input voltage $$\frac{(E_{out})}{E_{in}}$$

for the circuit of Fig. 2 is:

(12) $$\frac{E_{out}}{E_{in}} = \frac{-R}{4(R+2R_2)} e^{-j2\theta}$$

(13) $$\text{Where } \theta = \arctan \frac{2X_L - X_c}{R + 2R_2}$$

Examining Equation 12 for the circuit of Fig. 2, it is seen that the attenuation is dependent upon the resistors of value R and $R_2$. Since these resistors as shown in Fig. 2 have fixed values, it follows that the attenuation function is a constant. The phase ratio as shown by Equation 13 is dependent upon the elements of reactance value $X_L$, $X_c$, and resistance values R and $R_2$. As all of these elements as shown by Fig. 2 are constant excepting the inductive reactance $X_L$ of inductor 17, the phase ratio is dependent upon the value of inductive reactance $X_L$ and varies as inductor 17 is varied.

It is further obvious from Equations 12 and 13 that assuming all network elements are maintained at a fixed value, and the frequency of the input energizing source is varied, the attenuation of the network, dependent only upon resistances R and $R_2$ which do not vary with frequency, remains constant, while the phase shift provided by the network varies in accordance with the change in frequency variable elements $X_L$ and $X_c$ as seen from Equation 13. Thus, it is mathematically seen, that the network of Fig. 2 acts as a phase shifting device whose phase shift between input and output voltage is dependent upon the inductive reactance $X_L$ of inductor 17, and whose attenuation remains constant as the phase is varied. A similar mathematical and analysis of the circuits of Figs. 3 and 4, may be obtained from the above-mentioned publication, and it is there mathematically shown that these circuits act in a manner similar to the circuit of Fig. 2 in permitting an input voltage to be shifted in phase by variation of the T leg impedance, generally represented as C in Fig. 5, while attenuating the input voltage by a constant amount over the range of phase shift.

Summarizing, the circuits presented show a phase shifting network having a common ground connecting input and output circuits and therefore capable of application, without isolating devices, in single ended circuits. These networks are capable of wide phase shifting ranges by variation of only a single control having one grounded side, permitting their use over a wide range of frequencies. They are inherently constant attenuation devices capable of use with low input and output impedances over the phase shifting ranges and accordingly eliminate the need for amplitude equalizing devices. These characteristics are attributable to the given relationships of the element values as set forth in Equations 1 through 4 inclusive, for the network whose phase is varied by change in the reactive T leg, and in Equations 5 and 6 for the network whose phase is varied by the resistive T leg, and accordingly this device is to be limited only by these above-mentioned relationships as various changes may be made by those skilled in the art for the types of elements in the general arrangement illustrated in Fig. 5.

The invention described herein may be manufactured and used by or for the Government of the United States of America for governmental purposes without the payment of any royalties thereon or therefor.

What is claimed is:

1. An electrical phase shifting network comprising four impedance arms in circuit with an equal value input load resistance and output load resistance, impedance arm one connected in series with the input and output resistances, arms two and three comprising substantially pure capacitive reactance elements of fixed equal value and sign, connected in series across arm one, arm four comprising a variable impedance interposed in circuit connecting the junction point of arms two and three with the opposite end of the output resistance, the reciprocal of the sum of the values of the input resistance and the impedance presented by one-half the value of arm one in parallel with the value of arm two, minus the reciprocal of the sum of the complex values of the input resistance, the third arm, and twice the fourth arm, equaling a complex ratio whose magnitude is independent of said fourth impedance, and whose phase angle is dependent upon the value of said fourth impedance.

2. An electrical phase shifting network comprising four impedance arms in circuit connection with equal input and output loads comprising substantially pure resistance, network arm one connected in series with these input and output loads, arms two and three comprising substantially pure capacitive reactance elements of equal sign and magnitude connected in series across arm one, arm four including fixed resistance and variable reactance elements connecting the junction point of arms two and three with the unconnected end of the output load, the magnitude of arm two being much greater than that of the load, and that of arm one, one-half the impedance value of arm one equaling the sum of the output load impedance plus four times the resistance of impedance arm four, whereby the attenuation of the transfer function of the network is fixed and independent of any reactance with circuit and the phase angle of the transfer function has a value dependent upon the reactance of variable arm four.

3. A phase shifting network of the bridged-T type comprising four impedance arms, an input resistance and an output resistance of equal value in series with the network, the series impedances of the network being of equal sign and magnitude, said magnitude being much greater than the input resistance and the bridged impedance, the T leg impedance being variable and including fixed resistance and variable reactance elements, the bridging impedance comprising a substantially pure resistance element and having a value equal to twice the input resistance plus eight times the value of the resistance in the T leg, whereby the complex ratio of output to input of this network has an attenuation independent of the variable T leg reactance and a phase angle directly dependent upon the value of the variable T leg reactance.

4. In the device of claim 3 the series T impedances comprising substantially pure capacitance elements.

5. In the device of claim 4 the series reactances having a magnitude much greater than said bridging resistance.

6. In the device of claim 5, an input source of fixed frequency energizing the unconnected end of said input resistance to ground, the unconnected end of said T leg impedance and the unconnected end of said output resistance being connected to ground, said T leg impedance comprising a series circuit of inductive reactance and resistance elements shunted by a variable capacitance, said inductive value being equal to ¼ the value of said series T impedances, whereby variation of said variable capacitance varies said phase angle while maintaining said magnitude attenuation constant.

7. In the device of claim 3 an input source of fixed frequency energizing the unconnected end of said input resistance to ground, the unconnected end of said T leg impedance and the unconnected end of said output resistance being connected to ground, said T leg impedance comprising a series circuit of variable inductive reactance and resistance elements whereby variation of said variable inductance varies said phase angle while maintaining said magnitude attenuation constant.

8. A phase shifting network of the bridged-T type comprising four impedance arms, an input resistance, and an output resistance of equal value in series with the network, the two series impedances of the network comprising reactances of equal sign and magnitude, said magnitude being much greater than the input resistance, the T leg impedance comprising a substantially pure variable resistance, the bridging impedance comprising a substantially pure reactance element of opposite sign to said series impedances, the bridging impedance having a magnitude much greater than the input resistance, whereby the complex ratio of output to input of the network has an attenuation independent of the variable T leg resistance and a phase angle directly dependent upon the value of the variable T leg resistance.

9. A phase shifting network of the bridged-T type comprising four impedance arms, an input resistance and an output resistance of equal value in series with the network, an energizing source connected from the opposite end of said input resistance to ground, the unconnected end of the T leg impedance arm and the unconnected end of said output resistance being connected to ground, the series impedances of the network comprising reactances equal in sign and magnitude and much greater than the input resistance, the bridging impedance including a reactive component of opposite sign to said series impedances and equal in value to ¼ their combined value, the reactive component of said bridging impedance being much greater than the resistance component and much greater than the sum of said input and output resistances, whereby the complex ratio of output voltage across said output resistance to input voltage has a magnitude proportional to the ratio of the output resistance to the sum of bridging impedance plus output resistance, and a phase proportional to the ratio of the series impedance to the sum of input resistance plus twice the grounded T leg impedance.

10. In the device of claim 9 the series impedances comprising substantially pure reactance.

11. In the device of claim 10 the grounded T leg comprising a substantially pure variable resistance element, whereby variation of said resistance varies said phase output ratio while maintaining said magnitude ratio constant.

12. A device as in claim 11 wherein said bridging impedance comprises a substantially pure inductance element.

13. In the device of claim 12 said series impedances comprising substantially pure capacitive elements.

MYRON G. PAWLEY.

No references cited.